United States Patent
Tsukasaki (10) Patent No.: US 8,544,862 B2
(45) Date of Patent: Oct. 1, 2013

(54) VEHICLE STEERING DEVICE

(75) Inventor: Yuichiro Tsukasaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 157 days.

(21) Appl. No.: 13/064,356

(22) Filed: Mar. 21, 2011

(65) Prior Publication Data

US 2011/0233886 A1    Sep. 29, 2011

(30) Foreign Application Priority Data

Mar. 26, 2010   (JP) ................................. 2010-071695

(51) Int. Cl.
*B62D 7/09*   (2006.01)

(52) U.S. Cl.
USPC .................. 280/89; 280/124.131; 280/89.12; 280/93.502; 280/93.512

(58) Field of Classification Search
USPC ....... 280/124.125, 124.13, 124.131, 124.133, 280/124.134, 89, 89.11, 89.12, 90, 93.5, 280/93.501, 93.502, 93.51, 93.512
IPC ........................................................ B62D 7/09
See application file for complete search history.

(56) References Cited

U.S. PATENT DOCUMENTS

| | | | | | |
|---|---|---|---|---|---|
| 3,337,232 | A | * | 8/1967 | Peickii et al. | 280/89.11 |
| 3,448,991 | A | * | 6/1969 | Leggett | 280/89.11 |
| 4,697,817 | A | * | 10/1987 | Jefferson | 280/89.12 |
| 4,708,354 | A | * | 11/1987 | Moore | 280/89.11 |

FOREIGN PATENT DOCUMENTS

| | | |
|---|---|---|
| JP | 6-227423 A | 8/1994 |
| JP | P3994780 B2 | 8/2007 |

\* cited by examiner

*Primary Examiner* — Ruth Ilan
(74) *Attorney, Agent, or Firm* — McGinn IP Law Group, PLLC (57) ABSTRACT

In a vehicle steering device, extendable portions whose elastic properties corresponding to a force acting in a compressing direction and whose elastic properties corresponding to a force acting in a stretching direction are asymmetrical are disposed in a symmetric fashion at intermediate sections of tie rods. Thus, an effective steering gear ratio with respect to leftward and rightward steering can be properly changed in accordance with a vehicle speed by using a simple configuration that does not use a complex mechanism having a motor. In this case, a steering gear ratio can be mainly changed for one of the wheels, while a linear lateral force corresponding to steering can be generated at the other wheel. Moreover, since the steering gear ratio can be changed mechanically without performing motor control, the occurrence of control delay can be prevented, thereby reliably preventing deterioration of the driver's operational feel.

15 Claims, 6 Drawing Sheets

VEHICLE STEERING DEVICE

CROSS REFERENCES TO RELATED APPLICATIONS

The present application claims priority from Japanese Patent Application No. 2010-071695 filed on Mar. 26, 2010, the entire contents of which are hereby incorporated by reference.

BACKGROUND OF THE INVENTION

1. Field of the Invention

The present invention relates to vehicle steering devices that input a steering force to 'link mechanisms so as to turn left and right wheels.

2. Description of the Related Art

Generally, when a steering gear ratio is set to a low value (i.e., when the steering gear ratio is set to a so-called quick state in which the wheels are turned relatively fast in response to steering of a steering wheel) in a vehicle steering device, maneuverability in a low-speed running mode is enhanced, whereby the driver's driving load can be reduced. At the same time, when the steering gear ratio is set to the quick state, the vehicle's responsiveness to turning in a high-speed running mode becomes excessive, possibly increasing the driver's driving load.

In contrast, when the steering gear ratio is set to a high value (i.e., when the steering gear ratio is set to a so-called slow state), the vehicle's responsiveness to turning in the high-speed running mode becomes moderate, whereby the driver's driving load can be reduced. At the same time, when the steering gear ratio is set to the slow state, maneuverability is deteriorated in the low-speed running mode, possibly increasing the driver's driving load.

As countermeasures against these problems, for example, Japanese Unexamined Patent Application Publication No. 1994-227423 (referred to as "Patent Document 1" hereinafter) and Japanese Patent No. 3994780 (referred to as "Patent Document 2" hereinafter) disclose technologies for achieving both the properties required in the steering device for the high-speed running mode and the properties required in the steering device for the low-speed running mode by changing the steering gear ratio using a motor.

However, because a motor is used for changing the steering gear ratio in the technologies disclosed in Patent Documents 1 and 2 described above, the structure becomes complex, possibly leading to a significant increase in manufacturing costs. In addition, in the technologies disclosed in Patent Documents 1 and 2 described above, a slight delay in response occurring due to control performed for changing the steering gear ratio can possibly result in deterioration of the driver's operational feel.

SUMMARY OF THE INVENTION

In view of the circumstances described above, it is an object of the present invention to provide a vehicle steering device that can achieve excellent responsiveness to steering by using a simple configuration without deteriorating the driver's operational feel.

The present invention provides a vehicle steering device that inputs a turning force to left and right link mechanisms in response to steering so as to turn left and right wheels. In the vehicle steering device, elastic components whose elastic properties corresponding to a force acting in a compressing direction and whose elastic properties corresponding to a force acting in a stretching direction are asymmetrical are disposed in a symmetric fashion in the left and right link mechanisms.

With the vehicle steering device according to the present invention, excellent responsiveness to steering can be achieved using a simple configuration without deteriorating the driver's operational feel.

DESCRIPTION OF THE PREFERRED EMBODIMENTS

Figure 1:
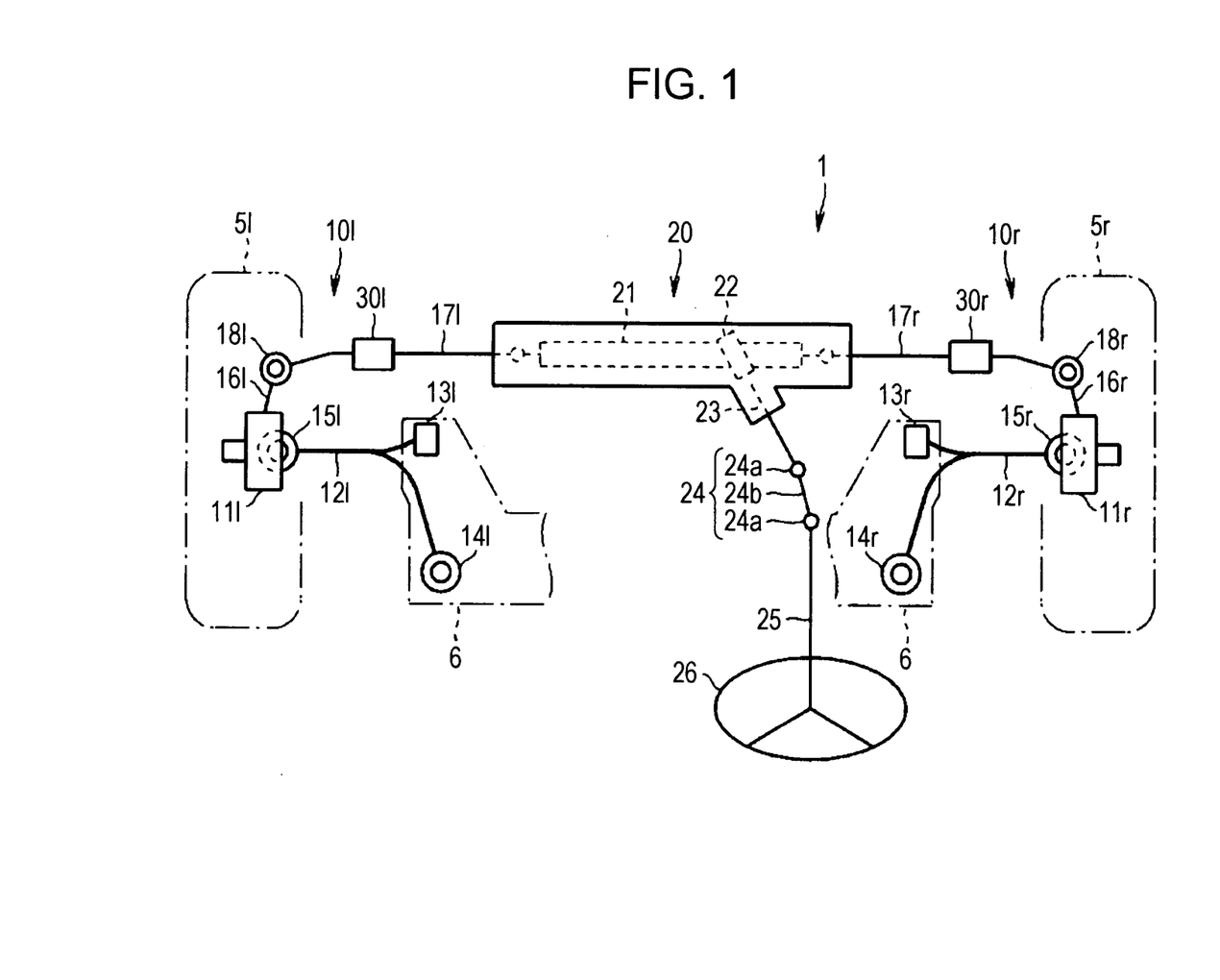
FIG. 1 is a schematic configuration diagram of a vehicle steering device.
Figure 2:
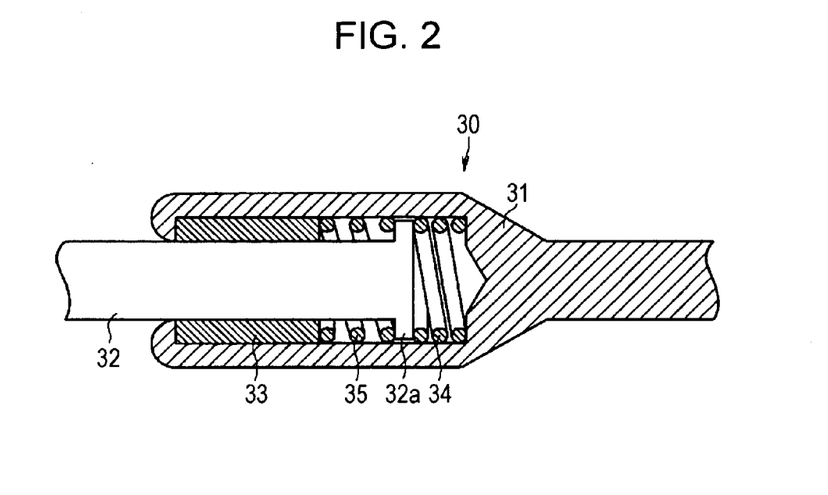
FIG. 2 is a cross-sectional view showing a relevant part of an extendable portion.
Figure 3:
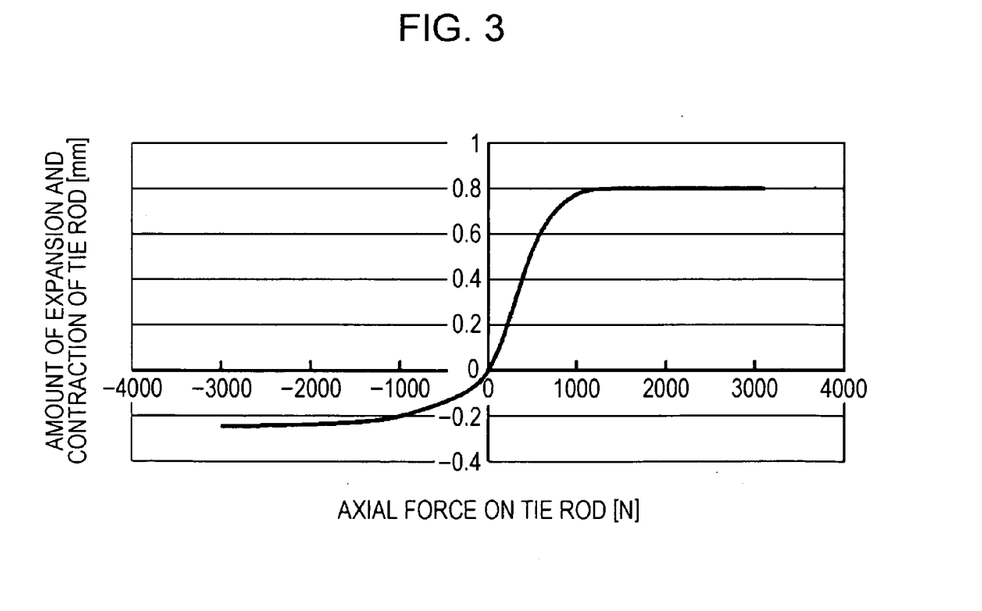
FIG. 3 is a characteristic diagram showing the relationship between an axial force applied to a tie rod and an amount of expansion and contraction of the tie rod.
Figure 4:
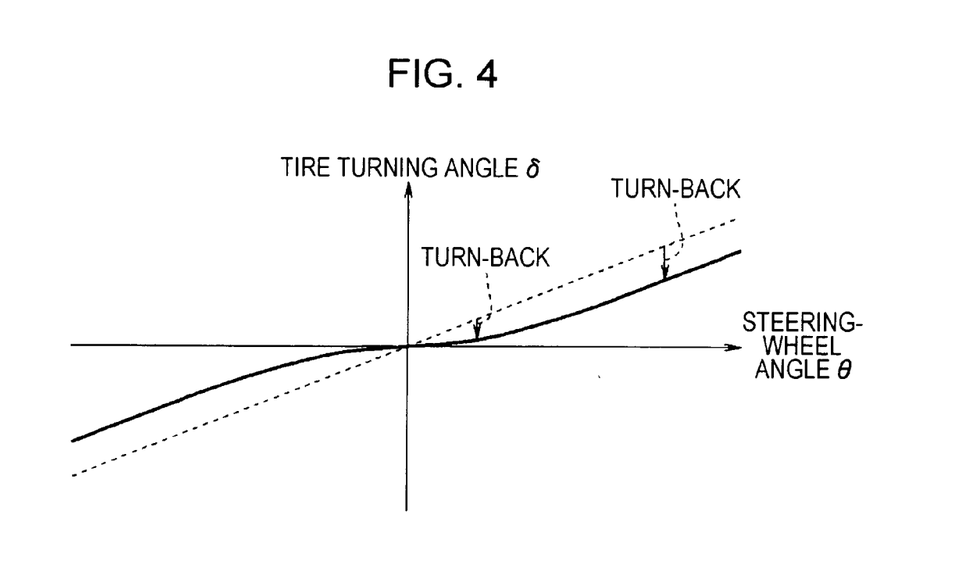
FIG. 4 is a characteristic diagram showing the relationship between a steering angle of a steering wheel and a turning angle of a wheel.
Figure 5:
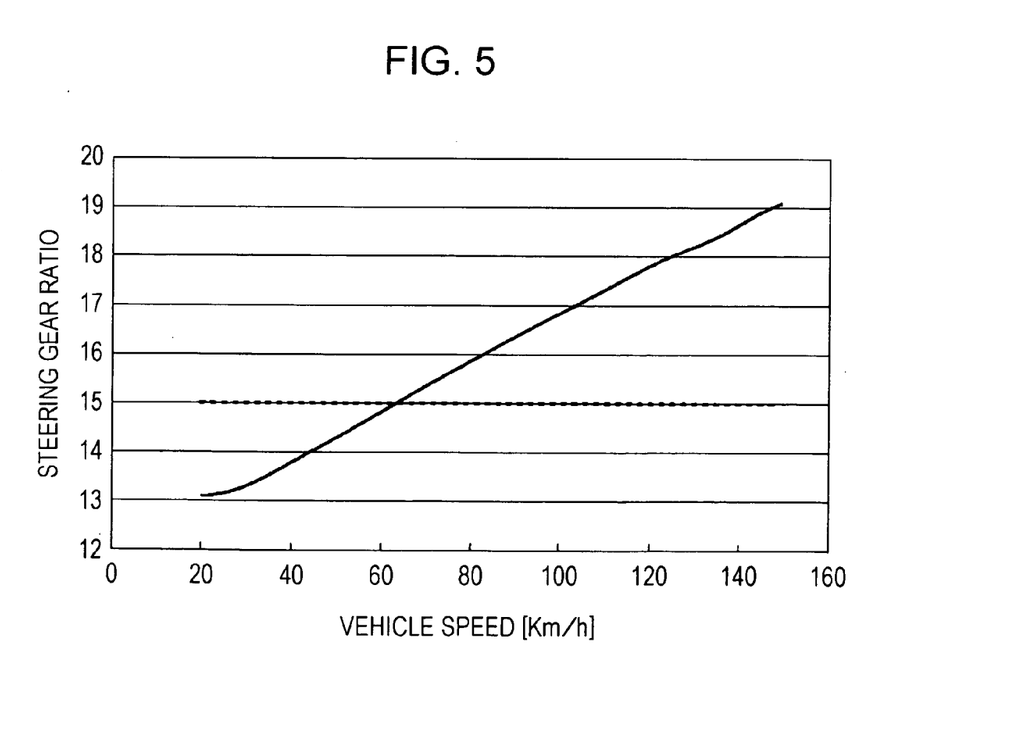
FIG. 5 is a characteristic diagram showing a steering gear ratio felt by a driver in accordance with vehicle speed.
Figure 6A:
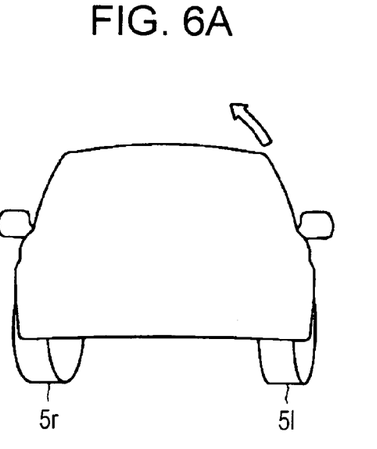
FIGS. 6A and 6B illustrate the relationship between a turning direction and a rolling direction of a vehicle.
Figure 6B:
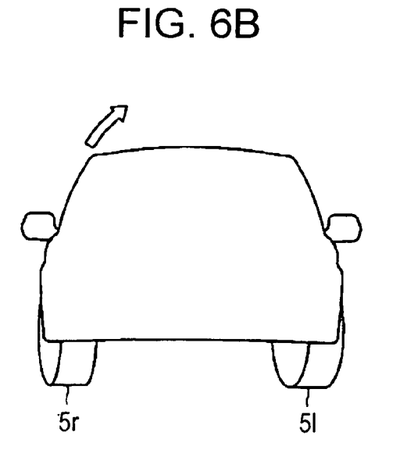
Figure 7:
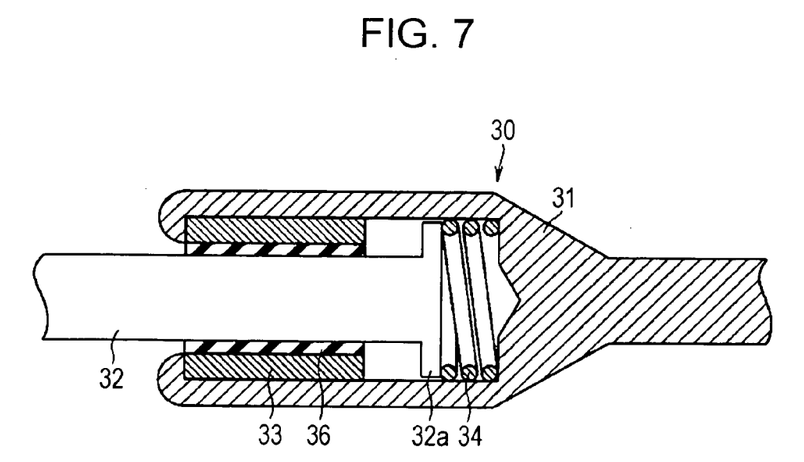
FIG. 7 is a cross-sectional view showing a relevant part of a modification of the extendable portion.
Figure 8:
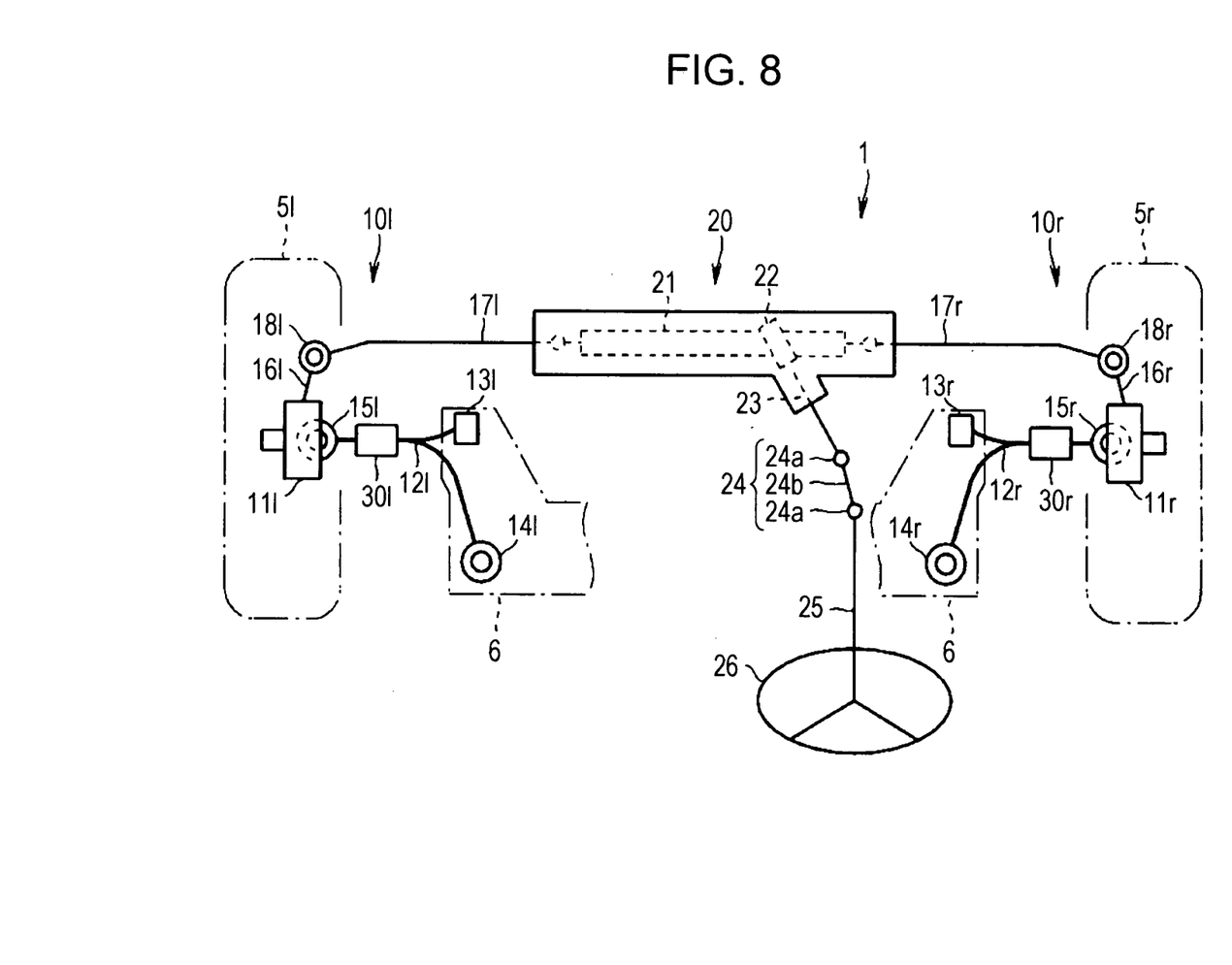
FIG. 8 is a schematic configuration diagram showing a modification of the vehicle steering device.
Figure 9:
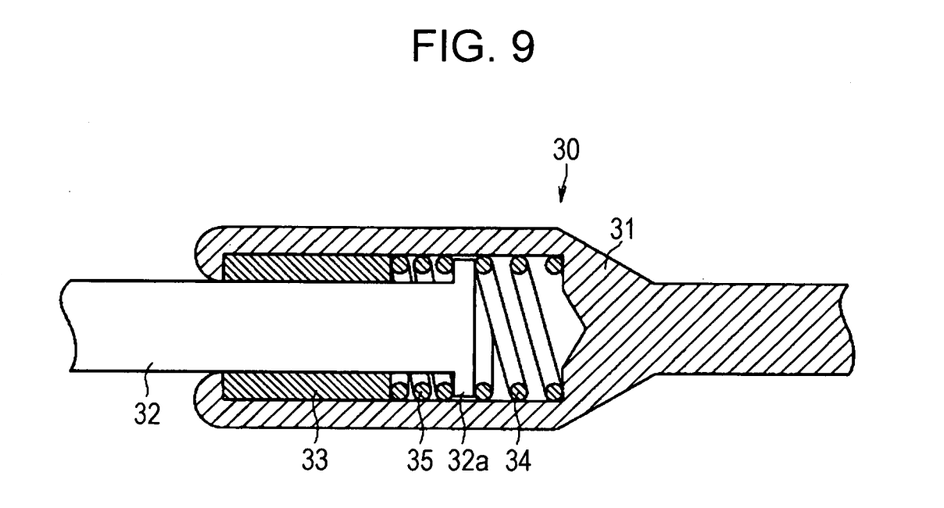
FIG. 9 is a cross-sectional view showing a relevant part of another modification of the extendable portion.
Figure 10:
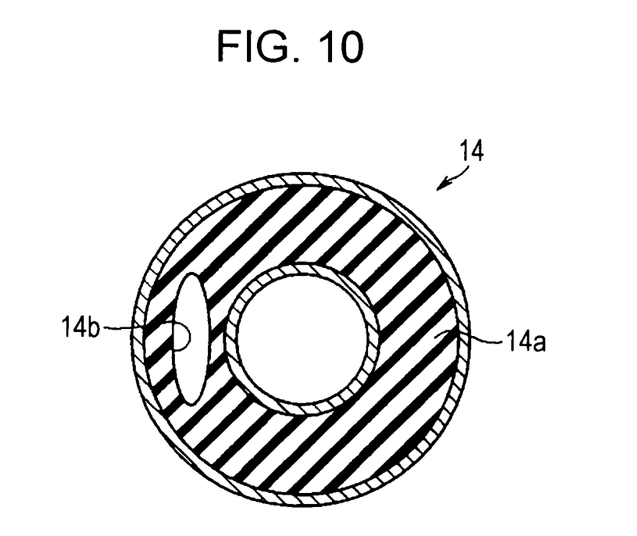
FIG. 10 is a cross-sectional view showing a relevant part of a bush.

An embodiment of the present invention will be described below with reference to the drawings. The drawings relate to the embodiment of the present invention. Specifically, FIG. 1 is a schematic configuration diagram of a vehicle steering device. FIG. 2 is a cross-sectional view showing a relevant part of an extendable portion. FIG. 3 is a characteristic diagram showing the relationship between an axial force applied to a tie rod and an amount of expansion and contraction of the tie rod. FIG. 4 is a characteristic diagram showing the relationship between a steering angle of a steering wheel and a turning angle of a wheel. FIG. 5 is a characteristic diagram showing a steering gear ratio felt by a driver in accordance with vehicle speed. FIGS. 6A and 6B illustrate the relationship between a turning direction and a rolling direction of a vehicle. FIG. 7 is a cross-sectional view showing a relevant part of a modification of the extendable portion. FIG. 8 is a schematic configuration diagram showing a modification of the vehicle steering device. FIG. 9 is a cross-sectional view showing a relevant part of another modification of the extendable portion. FIG. 10 is a cross-sectional view showing a relevant part of a bush.

In FIG. 1, reference numeral 1 denotes a vehicle steering device. The vehicle steering device 1 includes a pair of left and right link mechanisms 10*l* and 10*r* that respectively link left and right wheels (front wheels) 5*l* and 5*r* to a vehicle body, and a steering gearbox 20 that transmits a turning force to the link mechanisms 10*l* and 10*r*.

The link mechanisms 10*l* and 10*r* respectively include axle housings 11*l* and 11*r* that rotatably support the wheels 5*l* and 5*r* via hub bearings. Cross members 6 of the vehicle body are linked to lower sections of the axle housings 11*l* and 11*r* via front arms 12*l* and 12*r* that are substantially L-shaped in plan view.

In detail, fixed-end segments of the front arms 12*l* and 12*r* extend substantially in the front-rear direction of the vehicle body and are connected to the corresponding cross members 6 via front bushes 13*l* and 13*r* and rear bushes 14*l* and 14*r*, respectively. On the other hand, free-end segments of the front arms 12*l* and 12*r* extend outward in the vehicle-width direction, and the free ends of the front arms 12*l* and 12*r* are connected to lower sections of the axle housings 11*l* and 11*r* via ball joints 15*l* and 15*r*. Thus, the front arms 12*l* and 12*r* support the wheels 5*l* and 5*r* in a turnable manner to the cross members 6 of the vehicle body via the axle housings 11*l* and 11*r*.

The axle housings 11*l* and 11*r* are provided with, for example, knuckle arms 16*l* and 16*r* extending toward the front of the vehicle body. The knuckle arms 16*l* and 16*r* are linked to ends of tie rods 17*l* and 17*r*, which extend substantially in the vehicle-width direction, via tie-rod-end joints 18*l* and 18*r*.

The steering gearbox 20 contains therein a rack gear 21 extending in the vehicle-width direction. Left and right ends of the rack gear 21 are coupled to base ends of the tie rods 17*l* and 17*r*.

Furthermore, the rack gear 21 is meshed with a pinion gear 22. A pinion shaft 23 protruding from the pinion gear 22 is linked to a steering shaft 25 via a joint portion 24 constituted of two universal joints 24*a* and a joint shaft 24*b*. Moreover, a steering wheel 26 is fixed to the steering shaft 25.

In this embodiment, a gear ratio (steering gear ratio) between the pinion gear 22 and the rack gear 21 is set to a relatively low value (i.e., a gear ratio of, for example, about 13 which allows for a relatively quick turn of the wheels 5*l* and 5*r* in response to steering of the steering wheel 26 by a driver) so as to achieve good maneuverability in a low-speed running mode.

In the vehicle steering device 1 according to this embodiment having such a basic configuration, extendable portions 30*l* and 30*r* serving as elastic components are respectively provided at intermediate sections of the left and right tie rods 17*l* and 17*r* in a bilaterally symmetric fashion. In the following description, if the left and right sides of the vehicle body have the same configuration, the suffixes "l" and "r" will be sometimes omitted to simplify the description.

As shown in FIG. 2, a first end of the extendable portion 30 has a tubular female shaft 31. The female shaft 31 has a cylindrical guide member 33 fixed therein. A second end of a substantially columnar male shaft 32 is slidably fitted within the inner periphery of the guide member 33.

The second end of the male shaft 32 is provided with an outward flange 32*a*. The outward flange 32*a* is accommodated in a movable manner within a gap between an inner end surface of the female shaft 31 and a second end surface of the guide member 33. Furthermore, a first spring member 34 is interposed between the inner end surface of the female shaft 31 and the outward flange 32*a*, and a second spring member 35 is interposed between the second end surface of the guide member 33 and the outward flange 32*a*.

In this embodiment, the first spring member 34 operates when a force acting in a compressing direction is applied to the extendable portion 30, and the second spring member 35 operates when a force acting in a stretching direction is applied to the extendable portion 30. The first spring member 34 has a greater spring constant and is shorter than the second spring member 35 so that properties (contraction properties) corresponding to the force in the compressing direction and properties (expansion properties) corresponding to the force in the stretching direction are asymmetrically set in the extendable portion 30. More specifically, as shown in FIG. 3, for example, when an axial force in the stretching direction (positive direction) is applied to the tie rod 17, the extendable portion 30 is set to expand substantially linearly in an axial-force range of about 0 to 1000 N with an expansion limit of about 0.8 mm. On the other hand, when an axial force in the compressing direction (negative direction) is applied to the tie rod 17, the extendable portion 30 is set to contract substantially linearly in an axial-force range of about 0 to −1000 N with a contraction limit of about 0.2 mm.

In such a configuration, when the driver steers the steering wheel 26 to input a steering force in a rightward turning direction, for example, the right tie rod 17*r* receives an axial force in the compressing direction, causing the right extendable portion 30*r* to contract. On the other hand, the left tie rod 17*l* receives an axial force in the stretching direction, causing the left extendable portion 30*l* to expand. The operation of these extendable portions 30*l* and 30*r* causes the tie rods 17*l* and 17*r* to shift entirely outward in the turning direction, as compared with when the extendable portions 30*l* and 30*r* are not provided.

Furthermore, when the driver steers the steering wheel 26 to input a steering force in a leftward turning direction, for example, the right tie rod 17*r* receives an axial force in the stretching direction, causing the right extendable portion 30*r* to expand. On the other hand, the tie rod 17*l* receives an axial force in the compressing direction, causing the left extendable portion 30*l* to contract. The operation of these extendable portions 30*l* and 30*r* causes the tie rods 17*l* and 17*r* to shift entirely outward in the turning direction, as compared with when the extendable portions 30*l* and 30*r* are not provided.

The shifting of the extendable portions 30*l* and 30*r* varies depending on the axial force applied to the tie rods 17*l* and 17*r*, and a ratio of a tire turning angle δ to a steering-wheel angle θ (responsiveness) correspondingly changes. Specifically, as shown in FIG. 4, for example, when the vehicle makes a turn, the extendable portions 30*l* and 30*r* operate so as to turn back the turning angle (tire turning angle) δ, mechanically generated by the steering gearbox 20 in accordance with the steering angle (steering-wheel angle) θ, depending on the axial force applied to the tie rods 17*l* and 17*r*. However, because the amount of expansion and contraction of the extendable portions 30*l* and 30*r* is limited, a variation in the turn-back amount is limited and kept fixed when the axial force applied to the tie rods 17*l* and 17*r* reaches a predetermined value or greater (that is, when an absolute value of the steering-wheel angle θ reaches a predetermined value or greater).

As commonly known, when the vehicle makes a turn during a low-speed running mode, a range in which the absolute value of the steering-wheel angle θ (tire turning angle δ) is relatively large is generally used. On the other hand, when the vehicle makes a turn during a high-speed running mode, a range in which the absolute value of the steering-wheel angle θ (tire turning angle δ) is relatively small is generally used. Therefore, as it is apparent from a characteristic shown in FIG. 4, when the vehicle makes a low-speed turn in which the tire turning angle δ is large, an effect the extendable portions 30*l* and 30*r* have on the tire turning angle δ (i.e., the amount by which the tires are turned back) is very small. Thus, with the original quick gear ratio of the steering gearbox 20, good maneuverability can be ensured in the low-speed range. On the other hand, when the vehicle makes a high-speed turn in which the tire turning angle δ is small, an effect the extendable portions 30*l* and 30*r* have on the tire turning angle δ (i.e., the amount by which the tires are turned back) becomes greater. Thus, when viewed as a change in an effective steering gear ratio, an advantage equivalent to that when the steering gearbox 20 has a slow gear ratio can be achieved.

Accordingly, both good maneuverability during a low-speed turn and smooth vehicle responsiveness during a high-speed turn can be achieved, thereby reducing the driver's driving load for the entire speed range. Specifically, due to the aforementioned advantage, for example, the operation of the extendable portions 30l and 30r allows for a slower effective gear ratio felt by the driver as the vehicle speed increases even when the steering gearbox 20 has a quick gear ratio (see FIG. 5).

According to this embodiment, since the extendable portions 30l and 30r whose elastic properties corresponding to the axial force in the compressing direction and whose elastic properties corresponding to the axial force in the stretching direction are asymmetrical are provided in a symmetric fashion at the intermediate sections of the left and right tie rods 17l and 17r, respectively, excellent responsiveness to steering can be achieved using a simple configuration without deteriorating the driver's operational feel. Specifically, by disposing the extendable portions 30l and 30r at the intermediate sections of the left and right tie rods 17l and 17r, the effective steering gear ratio with respect to leftward and rightward steering can be properly changed in accordance with the vehicle speed by using a simple configuration that does not use a complex mechanism having a motor or the like. In this case, the elastic properties in the compressing direction and the elastic properties in the stretching direction are asymmetrically set in the extendable portions 30l and 30r, and the extendable portions 30l and 30r are disposed at the intermediate sections of the tie rods 17l and 17r in a bilaterally symmetric fashion, whereby the steering gear ratio can be mainly changed for one of the wheels, while a linear lateral force corresponding to steering can be generated at the other wheel. In addition, since the steering gear ratio can be changed mechanically without performing motor control, the occurrence of control delay can be prevented, thereby achieving excellent operational feel for the driver.

Moreover, the properties of each of the extendable portions 30l and 30r are set such that the amount of deformation thereof when positioned outward in the turning direction is relatively greater than the amount of deformation thereof when positioned inward in the turning direction. Consequently, for example, rolling of the vehicle occurring when making a turn can be suppressed by utilizing a jack-down phenomenon (that is generating a power pulling a vehicle body downward) caused by a difference in the amount of turn between the left and right wheels 5l and 5r, as shown in FIGS. 6A and 6B, thereby further improving the driver's operational feel.

The configuration of the extendable portion 30 is not limited to that described above, and may alternatively be, for example, a configuration shown in FIG. 7. Specifically, the extendable portion 30 shown in FIG. 7 has a substantially cylindrical rubber member 36 fixed between the outer periphery of the male shaft 32 and the inner periphery of the guide member 33. Furthermore, the extendable portion 30 has, for example, a spring member 34 only between the outward flange 32a of the male shaft 32 and the inner end surface of the female shaft 31. Due to elastic deformability of the rubber member 36 and the spring member 34, the elastic properties corresponding to an axial force in the compressing direction and the elastic properties corresponding to an axial force in the stretching direction are asymmetrically set in the extendable portion 30. Specifically, when an axial force in the stretching direction (positive direction) is applied to the tie rod 17, the extendable portion 30 is set to expand substantially linearly in an axial-force range of about 0 to 1000 N with an expansion limit of about 0.8 mm. On the other hand, when an axial force in the compressing direction (negative direction) is applied to the tie rod 17, the extendable portion 30 is set to contract substantially linearly in an axial-force range of about 0 to −1000 N with a contraction limit of about 0.2 mm.

Furthermore, although the above embodiment is directed to an example where the extendable portions 30l and 30r are disposed on the tie rods 17l and 17r of the link mechanisms 10l and 10r, the present invention is not limited to this configuration. For example, as shown in FIG. 8, the extendable portions 30l and 30r may alternatively be disposed on the front arms 12l and 12r. In this case, the properties of the extendable portions 30l and 30r are preferably inverted relative to the properties thereof when disposed on the tie rods 17l and 17r. Specifically, as shown in FIG. 9, for example, by inverting the relationship between the first spring member 34 and the second spring member 35 in terms of spring constant and length, desired properties can be obtained. Furthermore, in place of the extendable portions 30l and 30r, the front arms 12l and 12r can use, for example, the front bushes 13l and 13r or the rear bushes 14l and 14r as elastic components. For example, when the rear bush 14 is used as an elastic component as shown in FIG. 10, a recessed space 14b is provided at one side of a bush body 14a in the vehicle-width direction so that the rear bush 14 can function as an elastic component whose elastic properties corresponding to an axial force in the compressing direction and whose elastic properties corresponding to an axial force in the stretching direction are asymmetrical.

What is claimed is:

1. A vehicle steering device that inputs a turning force to left and right link mechanisms in response to a steering action so as to turn left and right wheels, comprising:
    elastic components comprising first elastic properties corresponding to a force acting in a compressing direction and second elastic properties corresponding to a force acting in a stretching direction, said elastic components being configured to be asymmetrical and disposed in a symmetric fashion in the left and right link mechanisms,
    wherein the left and right link mechanisms each include an arm that support the wheels in a turnable manner relative to a vehicle body, and
    wherein the elastic components are disposed in the arm.

2. The vehicle steering device according to claim 1, wherein the left and right link mechanisms each further comprises a tie rod that transmit the turning force to the wheels.

3. The vehicle steering device according to claim 1, wherein the first elastic properties corresponding to the force in the compressing direction and the second elastic properties corresponding to the force in the stretching direction are set in the elastic components such that an amount of deformation thereof when positioned outward in a turning direction is relatively greater than an amount of deformation thereof when positioned inward in the turning direction.

4. The vehicle steering device according to claim 2, wherein the first elastic properties corresponding to the force in the compressing direction and the second elastic properties corresponding to the force in the stretching direction are set in the elastic components such that an amount of deformation thereof when positioned outward in a turning direction is relatively greater than an amount of deformation thereof when positioned inward in the turning direction.

5. The vehicle steering device according to claim 1, wherein each of the left side and right side arms are configured to compress and extend at the respective elastic component thereof.

6. A vehicle steering apparatus, comprising:
 a first arm associated with a first wheel of a vehicle and a second arm associated with a second wheel of the vehicle, the first arm and second arm being configured to provide a force to the first wheel and the second wheel, respectively; and
 an extendable portion provided in an intermediate portion of each of the first arm and second arm, said extendable portion being configured to asymmetrically stretch in a first direction and a second direction.

7. The vehicle steering apparatus according to claim 6, wherein said extendable portion comprises:
 a tubular female shaft, said tubular female shaft comprising a first end surface and a second end surface, the first end surface and the second end surface being provided inside the tubular female shaft;
 a cylindrical guide member formed inside the tubular female shaft;
 a shaft slidably fitted within an inner periphery of the cylindrical guide member;
 an outward flange provided at an end of the shaft;
 a first spring interposed between the first end surface and the flange; and
 a second spring interposed between the second end surface and the flange.

8. The vehicle steering apparatus according to claim 7, wherein the first spring is configured to operate when a force acting in a compression direction is applied to the extendable portion.

9. The vehicle steering apparatus according to claim 7, wherein the second spring member operates when a force acting in a stretching direction is applied to the extendable portion.

10. The vehicle steering apparatus according to claim 7, wherein the shaft is associated with a respective one of the first arm and the second arm.

11. The vehicle steering apparatus according to claim 7, wherein the female shaft is associated with a respective one of the first arm and the second arm.

12. The vehicle steering apparatus according to claim 7, wherein the first spring has a spring constant that is greater than a spring constant of the second spring.

13. The vehicle steering apparatus according to claim 7, wherein a length of the first spring is less than a length of the second spring.

14. A steering system, comprising:
 a left-side arm configured to communicate a steering force to a left-side wheel;
 a right-side arm configured to communicate the steering force to a right-side wheel;
 a right-side extendable portion provided in an intermediate portion of the right-side arm, the right-side extendable portion being configured to asymmetrically stretch in a first direction and a second direction; and
 a left-side extendable portion provided in an intermediate portion of the left-side arm, the left-side extendable portion being configured to asymmetrically stretch in the first direction and the second direction,
 wherein said left-side extendable portion and said right-side extendable portion are symmetrically provided on the left-side arm and the right-side arm, respectively.

15. The vehicle steering apparatus according to claim 14, wherein said left-side extendable portion and said right-side extendable portion each comprises:
 a tubular female shaft, said tubular female shaft comprising a first end surface and a second end surface, the first end surface and the second end surface being provided inside the tubular female shaft;
 a cylindrical guide member formed inside the tubular female shaft;
 a shaft slidably fitted within an inner periphery of the cylindrical guide member;
 an outward flange provided at an end of the shaft;
 a first spring interposed between the first end surface and the flange; and
 a second spring interposed between the second end surface and the flange.

* * * * *